US012688687B2

(12) United States Patent
Wu et al.

(10) Patent No.: US 12,688,687 B2
(45) Date of Patent: Jul. 21, 2026

(54) SYSTEMS AND METHODS FOR EXPLAINING MACHINE LEARNING MODELS

(71) Applicant: Shanghai United Imaging Intelligence Co., Ltd., Shanghai (CN)

(72) Inventors: Ziyan Wu, Lexington, MA (US); Meng Zheng, Cambridge, MA (US); Benjamin Planche, Briarwood, NY (US); Zhongpai Gao, Rowley, MA (US); Abhishek Sharma, Boston, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 235 days.

(21) Appl. No.: 18/438,486

(22) Filed: Feb. 11, 2024

(65) Prior Publication Data

US 2025/0259436 A1 Aug. 14, 2025

(51) Int. Cl.
G06V 10/86 (2022.01)
G06V 10/764 (2022.01)
(Continued)

(52) U.S. Cl.
CPC ............ G06V 10/86 (2022.01); G06V 10/764 (2022.01); G06V 10/7715 (2022.01); G06V 10/774 (2022.01); G06V 10/82 (2022.01)

(58) Field of Classification Search
CPC ........ G06N 3/0464; G06N 3/08; G06N 3/045; G06N 20/00; G06N 5/045; G06V 10/764;
(Continued)

(56) References Cited

U.S. PATENT DOCUMENTS 10,043,054 B2    8/2018   Remiszewski et al.
10,217,058 B2    2/2019   Gamon et al.
(Continued)

OTHER PUBLICATIONS

Agarwal, Aniket, and Ayush Mangal. "Visual relationship detection using scene graphs: A survey." arXiv preprint arXiv:2005.08045 (2020). (Year: 2020).*

(Continued)

*Primary Examiner* — Courtney Joan Nelson

(74) *Attorney, Agent, or Firm* — Zhong Law, LLC

(57) ABSTRACT

The decision process of a first machine learning (ML) model may be explained based on a second ML model implemented on an apparatus. The apparatus may obtain a prediction about an image made based on the first ML model. The apparatus may further determine visual concepts associated with the image that may have been used by the first ML model to make the prediction, and determine respective contributions of the visual concepts to the prediction made by the first ML model. The apparatus may then generate, based on the second ML model, a textual description that explains the respective contributions of the visual concepts to the prediction made by the first ML model. The second ML model may determine respective image features associated with the visual concepts, map the determined image features to corresponding text features, and generate the textual description based at least on the text features.

20 Claims, 5 Drawing Sheets

"Engine grille 1 shown in the front of the image and side mirror 2 shown in the top right corner of the image contributed most to the prediction of the ML model, followed by red headlight 3 on the top of the image and wheel 4 in the bottom right corner of the image"

(51) Int. Cl.

| | |
|---|---|
| *G06V 10/77* | (2022.01) |
| *G06V 10/774* | (2022.01) |
| *G06V 10/82* | (2022.01) |

(58) Field of Classification Search

CPC .... G06V 10/82; G06V 2201/03; G06V 20/46; G06V 10/7715; G06V 20/70; G06V 10/40; G06V 10/768; G06V 20/695; G06V 20/698; G06V 30/413; G06V 10/86; G06V 10/774; G06T 2207/20084; G06T 2207/20081; G06T 11/206; G06T 7/00; G06T 7/10; G06T 7/11; G06T 2210/12; G06T 2219/004; G06F 40/30; G06F 40/279; G06F 18/24; G06F 40/40; G06F 16/9024; G06F 16/345; G06F 30/27

See application file for complete search history.

(56) References Cited

U.S. PATENT DOCUMENTS

| | | | |
|---|---|---|---|
| 10,366,451 | B2 | 7/2019 | Kaznady |
| 10,621,486 | B2 | 4/2020 | Yao |
| 2018/0165604 | A1 | 6/2018 | Minkin et al. |
| 2019/0303404 | A1 | 10/2019 | Amer et al. |
| 2023/0386646 | A1* | 11/2023 | Tanwani ............. G06V 10/806 |

OTHER PUBLICATIONS

Kim, H.J., Kim, S., Lee, J.T., & Ko, B.C. (2023). Semantic Scene Graph Generation Based on an Edge Dual Scene Graph and Message Passing Neural Network. ArXiv, abs/2311.01192. (Year: 2023).*

Aminimehr, Amirhossein, Amirali Molaei, and Erik Cambria. "Entri: Ensemble learning with tri-level representations for explainable scene recognition." arXiv preprint arXiv:2307.12442 (2023). (Year: 2023).*

\* cited by examiner

Figure 1:
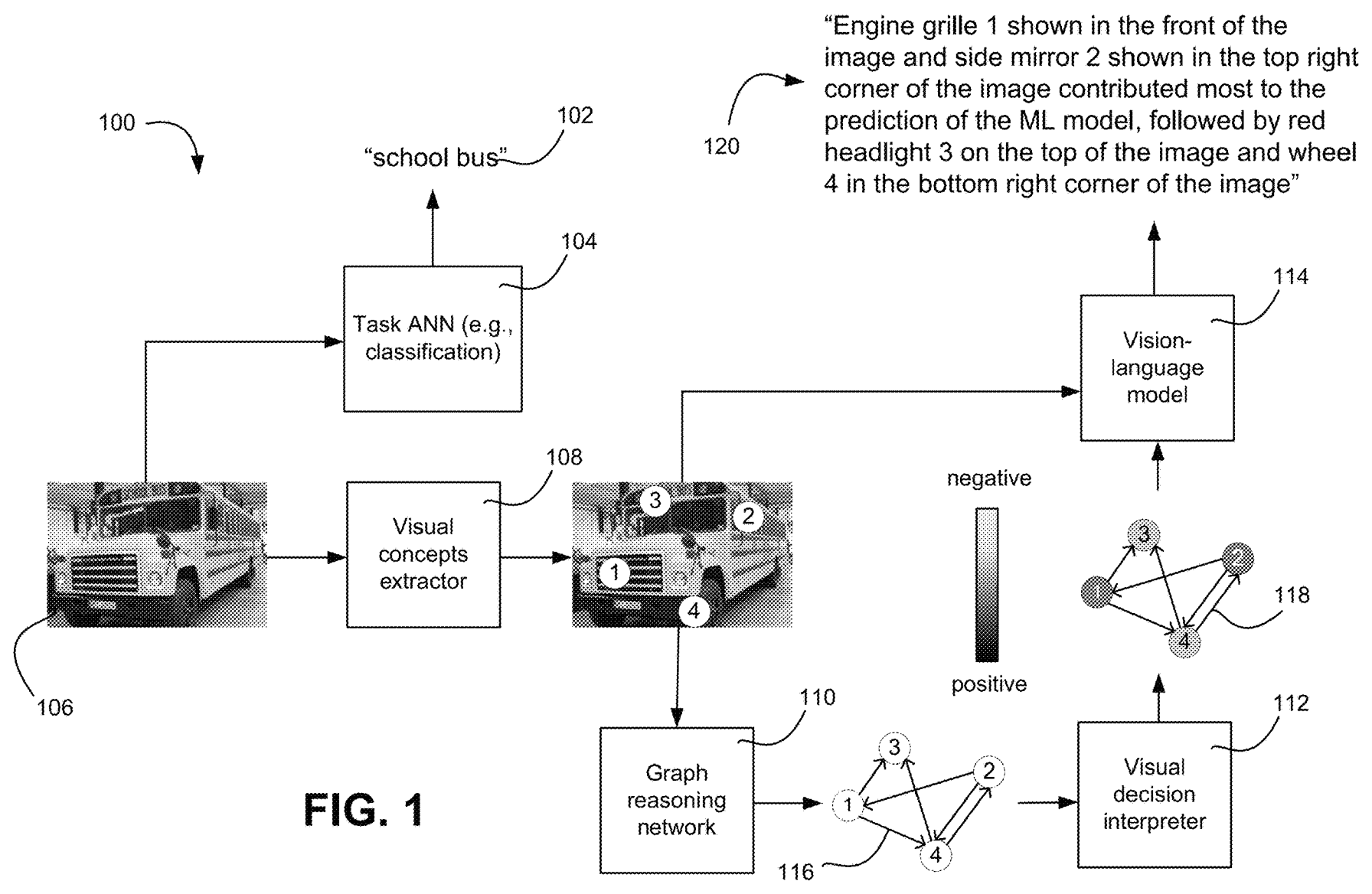

"Engine grille 1 shown in the front of the image and side mirror 2 shown in the top right corner of the image contributed most to the prediction of the ML model, followed by red headlight 3 on the top of the image and wheel 4 in the bottom right corner of the image"

120

114 — Vision-language model

118

112 — Visual decision interpreter negative positive

110 — Graph reasoning network

116

108 — Visual concepts extractor

102 — "school bus"

104 — Task ANN (e.g., classification)

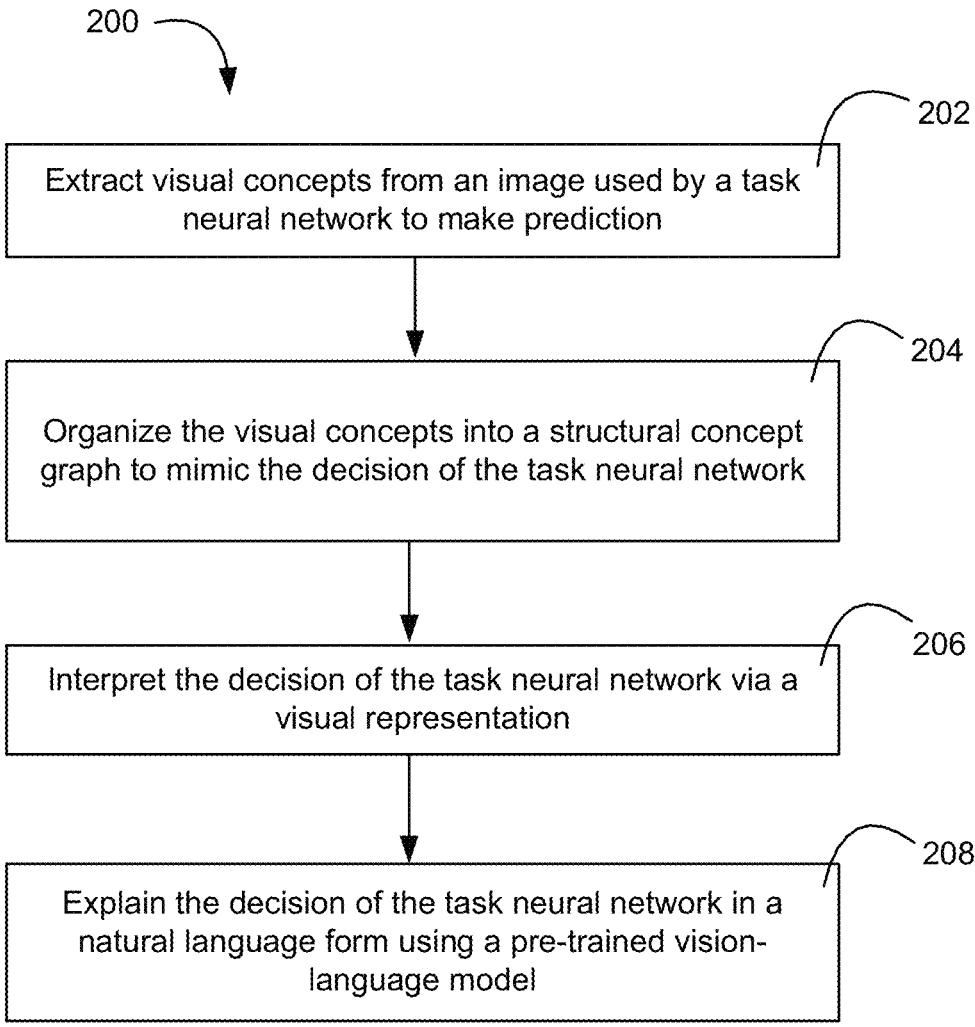

200

202

Extract visual concepts from an image used by a task neural network to make prediction

204

Organize the visual concepts into a structural concept graph to mimic the decision of the task neural network

206

Interpret the decision of the task neural network via a visual representation

208

Explain the decision of the task neural network in a natural language form using a pre-trained vision-language model

Initialize neural network parameters

404

Provide a training image to the neural network

406

Cause the neural network to make a prediction using presently assigned parameters

408

Determine a loss associated with the prediction

412

Determine and apply adjustments to neural network parameters via backpropagation

410

Training termination criteria satisfied?

No

Yes

End

SYSTEMS AND METHODS FOR EXPLAINING MACHINE LEARNING MODELS

BACKGROUND

With increasing use of machine learning (ML) in areas ranging from manufacturing to medicine, it may be critical to understand the decision process of ML models since such understanding may affect a user's trust in the ML models. Current ML-based systems perform tasks inside a "black box," without providing any indication of how an outcome is accomplished. While some techniques have been developed to explain the reasoning process of an ML model, the explanation is generally limited to demonstrating low-level relationships (e.g., correlations between image pixels and a prediction) and does not offer insight into the high-level logic that may have been applied by the ML model to arrive at a specific output. When provided, the explanation is also difficult to understand and does not provide guidance on how to improve the ML model. Accordingly, it may be desirable to provide systems and methods that are capable of not only explaining how an ML algorithm came to a result, but also presenting the explanation in an intuitive format.

SUMMARY

Described herein are systems, methods, and instrumentalities associated with explaining a decision process of a machine learning (ML) model. According to embodiments of the present disclosure, an apparatus may be configured to obtain a prediction about an image (e.g., a classification of the image), wherein the prediction may be made based on a first ML model. The apparatus may be further configured to determine visual concepts associated with the image that may have been used by the first ML model to make the prediction, and determine respective contributions of the visual concepts to the prediction made by the first ML model. The apparatus may then generate, based on a second ML model, a textual description that explains the respective contributions of the visual concepts to the prediction made by the first ML model. The second ML model may determine respective image features associated with the visual concepts, map the determined image features to corresponding text features, and generate the textual description based at least on the text features.

In examples, the second ML model may be trained using a plurality of image-text pairs from which the second ML model may learns a mapping between the image features associated with the visual concepts and the text features used to generate the textual description. For instance, the second ML model may learn, from the plurality of image-text pairs, a joint embedding space in which the image features associated with the visual concepts may be mapped (e.g., aligned) to the text features used to generate the textual description, and the second ML model may obtain the aforementioned text features from the joint embedding space.

In examples, each of the visual concepts described herein may correspond to one or more patches (e.g., groups of pixels) of the image. In examples, the second ML model may be implemented using at least an encoder and a decoder, wherein the encoder may configured to determine the respective image features associated with the visual concepts, and the decoder may be configured to generate the textual description that explains the respective contributions of the visual concepts to the prediction made by the first ML model. For instance, the decoder may map the image features associated with the visual concepts to the corresponding text features and generate the textual description based on the text features.

In examples, determining the respective contributions of the visual concepts to the prediction may include determining a graphical representation that indicates the respective contributions of the visual concepts to the prediction. The graphical representation may include nodes and edges, wherein each node may represent a respective one of the visual concepts and each edge may connect two nodes and represent a relationship of the visual concepts represented by the two nodes. In examples, the graphical representation may further indicate spatial relationships of the visual concepts in the image, wherein the second ML model may be configured to generate the textual description that explains the respective contributions of the visual concepts to the prediction made by the first ML model further based on the graphical representation.

BRIEF DESCRIPTION OF THE DRAWINGS

A more detailed understanding of the examples disclosed herein may be had from the following descriptions, given by way of example in conjunction with the accompanying drawings.

FIG. 1 is a simplified block diagram illustrating an example of explaining a decision (e.g., a prediction) made by a machine learning (ML) model according to embodiments of the present disclosure.

FIG. 2 is a flow diagram illustrating example operations associated with providing visual and textual interpretations to a decision made by an ML model according to embodiments of the present disclosure.

DETAILED DESCRIPTION

Figure 3:
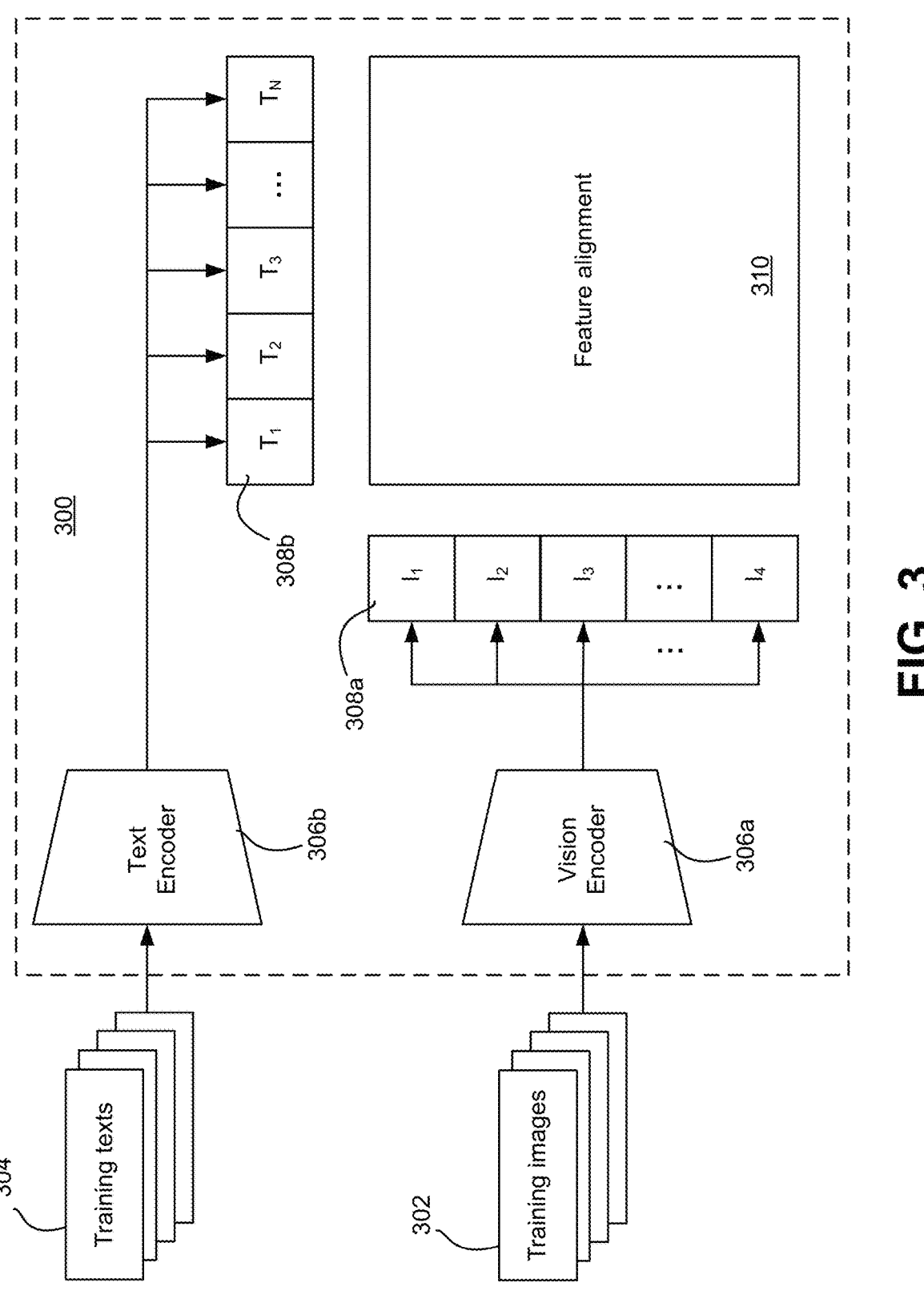
FIG. 3 is simplified block diagram illustrating an example of training a vision-language model according to embodiments of the present disclosure.

The present disclosure is illustrated by way of example, and not by way of limitation, in the figures of the accompanying drawings. A detailed description of illustrative embodiments will now be provided with reference to these figures. Although these embodiments may be described with certain technical details, it should be noted that the details are not intended to limit the scope of the disclosure.

FIG. 1 illustrates an example of explaining a decision 102 (e.g., a prediction) made by an artificial neural network (ANN) 104, which may be interchangeably referred to herein as a machine learning (ML) model. While FIG. 1 shows a classification of an input image 106 (e.g., "school bus") as the decision 102 made by ANN 104, those skilled in the art will appreciate that the techniques disclosed with respect to FIG. 1 may also be used to explain other types of neural network decisions, such as, e.g., image segmentations. As illustrated by FIG. 1, an apparatus 100 may be configured to explain the decision made by ANN 104, and the apparatus may include a visual concepts extractor 108, a graph reasoning neural network 110, a visual decision interpreter 112, and/or a vision-language model 114 (e.g., a neural network trained to match text with images). Apparatus 100 may be the same apparatus on which ANN 104 is implemented or a different apparatus that can access ANN 104 and/or decision 102 made by ANN 104 (e.g., ANN 102 may be implemented on a first apparatus or processor, while the other components shown in FIG. 1 may be implemented on a second apparatus or processor).

Visual concepts extractor 108 of apparatus 100 may be configured to determine visual concepts (e.g., groups of pixels representing respective image features or objects of interest for each candidate class) that may have been used by ANN 104 to make the decision 102. For example, the visual concepts for the "school bus" class may include an engine grille (e.g., the area represented by circle "1" in FIG. 1), a side mirror (e.g., the area represented by circle "2" in FIG. 1), a head lamp (e.g., the area represented by circle "3" in FIG. 1), and/or a wheel (e.g., the area represented by circle "4" in FIG. 1), which may be extracted using a convolutional neural network (CNN) (e.g., the CNN may be trained to learn respective features associated with the visual concepts and classify image pixels or patches into the visual concepts in response to detecting those features). In examples, visual concepts extractor 108 may apply a top-down gradient attention technique to constrain candidate regions for the visual concept to the foreground of image 106, thereby ruling out irrelevant background patterns. For instance, given an image I and a class-specific attention map M, visual concepts extractor 108 may binarize M into M' based on a threshold t (e.g., pixel values smaller than $\tau$ may be set to 0, while those larger than $\tau$ may be set to 1), and use the resulting image M' to generate a masked image $I'=I\times M'$ (e.g., $\times$ may represent element-wise multiplication) for visual concept determination. Through such pre-filtering, the visual concepts determination may focus on the foreground of the input image and reduce (e.g., minimize) the interference of the irrelevant image background.

Once the aforementioned visual concepts (e.g., class-specific visual concepts) are extracted by visual concepts extractor 108, graph reasoning network 110 may be used to determine the structural relationship of the visual concepts and further determine (e.g., trace or imitate) the reasoning process of ANN 104 via knowledge transfer and distillation (e.g., learn an ML model, which may be thought of as a student model, that produces the classification decision as ANN 104, which acts a teacher model). Additionally, graph reasoning network 110 may be further configured to produce a visual explanation 116 that illustrates the logic applied by ANN 104. In examples, graph reasoning network 110 may be configured to capture the structural relationship of the aforementioned visual concepts via one or more structural concept graphs (SCGs), each of which may be associated with a respective class and include nodes V and bidirectional edges E. Each node $v_i \in V$ may represent a relevant visual concept, while each edge $e_{ji}=(v_j,v_i) \in E$ may represent the spatial relationship of the nodes (e.g., visual concepts) connected by the edge and the dependency between those nodes (e.g., visual concepts). As such, graph reasoning network 110 may discover not only the visual concepts that may have contributed to the decision 106, but also the underlying interactions (e.g., represented by edge $e_{ji}$) that may have affected the decision 106. Since image 106 is represented by the SCGs, tracing the reasoning process of ANN 104 may be accomplished by optimizing graph reasoning network 110 so that, using the SCGs as its input, graph reasoning network 110 may make the same decision as ANN 104, with image 106 as its input. In example, the optimization may be realized using a knowledge distillation-based training strategy. For example, given an input image I and a trained neural network classifier F(•), along with n SCG hypotheses $h=\{h_1, h_2, \ldots h_n\}$ extracted from the input image, the parameters of graph reasoning network 110 (e.g., denoted as GRN) may be learned for h such that GRN(h) =F(I) to ensure prediction consistency between graph reasoning network 110 and ANN 104. In examples, GRN(•) may include two modules: a graph neural network G for all candidate classes with different class-specific $e_{ji}$ to learn the graph representation of the SCGs descried herein and an embedding network E that may be used to fuse multi-category SCGs for a final class prediction. This may be illustrated by the equations below:

$$GRN(h)=E(G(h))=F(I)$$

From the visual explanation 116 generated by graph reasoning network 110, an interpretation of the decision process of ANN 104 may be generated using visual decision interpreter 112. In examples, this may be accomplished as follows. From image 106, visual concepts extractor 108 and/or graph reasoning network 110 may make a prediction y representing the respective probabilities of candidate classes for the object of interest as follows:

$$y=E(G(h))=E(C_{i=1 \ldots m}(G^i(h_i))),$$

where $G^i$ may represent the graph neural network, G, as described herein equipped with class i's aggregate weight $e^i_{ji}$, $G^i(h_i)$ may represent the graph embedding for the ith hypothetical SCG comprising concept node and edge feature representations, and C may represent a concatenation operation. For each candidate class c, visual decision interpreter 112 may determine a corresponding class prediction score and compute the gradients of the class prediction score with respect to the graph embeddings from m hypotheses. For each hypothesis $h_i$, visual decision interpreter 112 may calculate a contribution score si with respect to prediction ye and use the contribution score to indicate the positive or negative contribution of each node (e.g., corresponding to a visual concept) and each edge (e.g., corresponding to the spatial relationship and/or dependency of the visual concepts connected by the edge) to the decision made by ANN 104. As illustrated by FIG. 1, visual decision interpreter 112 may be configured to provide a visual decision indicator 118 of the positive/negative contribution of each node or edge with different shading or color coding. For example, a darker color/shading may be used to indicate a positive contribution and a lighter color/shading may be used to indicate a negative contribution.

In addition to providing visual explanations (e.g., via visual decision indicator 118) of the decision process of ANN 104, apparatus 100 may be further configured to provide a textual explanation that describes its observation of the decision made by ANN 104 and modeled via visual concepts extractor 108, graph reasoning network 110, and visual decision interpreter 112. In examples, the textual explanation may be provided using vision-language model 114 shown in FIG. 1, which may be trained to understand the visual information contained in image 106 and/or visual decision indicator 118, and generate human-interpretable explanations of the visual information using natural language processing capabilities that the vision-language model may also acquire through the training. For example, vision-language model 114 may be trained using a dataset of images (e.g., image patches representing different visual concepts such as engine grilles, head lamps, mirrors etc.)

and graphs (e.g., graphs similar to visual decision indicator 118), with associated textual explanations, learn a mapping between visual embeddings associated with the images/graphs and textual embeddings associated with the textual explanations from the dataset, and predict a textual explanation (e.g., 120 of FIG. 1) based on the learned mapping when given a set of visual concepts and/or graphs.

In examples, vision-language model 114 may be implemented via a vision-language transformer that may be capable of handling both visual and textual inputs. The transformer may be trained to learn cross-modal interactions and dependencies of visual and textual embeddings and use a self-attention module to attend to different parts of an input sequence comprising the visual and textual embeddings based on their contextual relevance. Attention weights may be learned during the training, which may enable the transformer to focus on important elements. In examples, the vision-language transformer may utilize an encoder-decoder architecture. The encoder may be configured to encode features associated with an input (e.g., an image and/or graph) into image or vision embeddings, while the decoder may be configured to generate a textual description of the ML decision process in natural language based on the image embeddings encoded by the encoder and a mapping between the image embedding and text embeddings that the transformer may have learned through training (e.g., as described herein). For example, the decoder may generate a sequence of words to form a coherent and informative explanation of the meaning of visual decision indicator 118 by relating (e.g., mapping) specific features of the visual indicator to corresponding textual descriptions based on a learned joint embedding space that will be described in more detail with respect to FIG. 3.

FIG. 2 illustrates example operations 200 (e.g., by apparatus 100 of FIG. 1) that may be associated with providing visual and textual interpretations to a decision made by a machine-learning (ML) model. The example in FIG. 2 is described in the context of image classification, but those skilled in the art will appreciate that the example may also be applicable to other type of tasks.

As shown in FIG. 2, operations 200 may include extracting, at 202, visual concepts from an image used by the ML model (e.g., a task neural network) to make the prediction. The visual concepts may be extracted using visual concepts extractor 108 shown in FIG. 1 and as explained above may correspond to respective groups (e.g., patches) of pixels that may have influenced the classification decision of the ML model. Examples of such visual concepts may include an image patch that is associated with a large engine grille or an image patch that is associated with a red head lamp, may have steered the ML model towards predicting that the image is a "school bus" and not a "fire engine."

Operations 200 may additionally include organizing (e.g., via graph reasoning network 110 of FIG. 1) the visual concepts determined at 202 into a structural concept graph at 204 to mimic the decision of the task neural network. Such a structural concept graph may model the spatial correlation of the visual concepts so as to identify patterns or other important cues in the input image that may have been used by the ML model to form the decision. For example, the spatial distance between the windows of a school bus to its front wheels may be substantially different than the spatial distance between the windows of a car to its front wheels, so the spatial correlation of windows and wheels may be a factor that impacts the decision of the ML model. In examples, the structural concept graph may include nodes and bidirectional edges, wherein each node may represent a relevant visual concept and each edge may represent the spatial relationship of the nodes (e.g., visual concepts) connected by the edge and the dependency between those nodes (e.g., visual concepts). As such, the graph may model not only the visual concepts that have contributed to the decision of the ML model, but also the underlying interactions (e.g., as represented by the edges of the graph) that may have affected the decision.

Operations 200 may further include interpreting (e.g., via visual decision interpreter 112) the decision of the ML model (e.g., task neural network) via a visual representation at 206. For example, the operation at 206 may include determining casual importance scores of the visual concepts modeled by the graph described above, and provide a visual representation of the determined scores (e.g., using color coding or shading). For example, the respective casual importance (e.g., contributions) of the visual concepts to the prediction output may be mathematically quantified to certain values, normalized between 0 to 1. A value of 0 may mean the relevant visual concept makes no contribution or is not related to the prediction, while a value of 1 may mean the prediction is closely correlated to the visual concept. The casual importance scores of the visual concepts may be calculated, for example, based on respective gradients associated with the visual concepts that are used by the ML model in its decision process (e.g., the computing device or processor interpreting the decision of the ML model may have access to the algorithm used by the ML model).

Operations 200 may further include providing a textual explanation of the ML model prediction at 208, for example, using a pre-trained vision-language model (e.g., vision-language model 114 of FIG. 1). As described herein, the vision-language model may learn a mapping between corresponding visual embeddings and textual embeddings, and therefore may be capable of generating a human-interpretable explanation of the visual information contained in the visual concepts determined at 204 and/or the visual interpretation determined at 206. The vision-language model may be trained using a dataset of images and graphs, with associated textual explanations, and may learn the mapping between the visual embeddings and the textual embeddings from the dataset. Subsequently, when given the visual concepts and/or the graph described herein, the vision-language model may predict the textual explanation based on the learned mapping and visual embeddings extracted from the visual concepts and/or the graph.

FIG. 3 illustrates an example of training a vision-language model 300 (e.g., vision-language model 114 of FIG. 1) to learn a mapping between visual and textual embeddings (e.g., between visual and textual features) from a dataset comprising paired images 302 and textual descriptions 304. The training data may be obtained from various sources including, for example, the Internet (e.g., websites that may include images and descriptions that describe the content of the images), publicly accessible databases (e.g., figures and captions from repositories of academic publications), hospital records (e.g., radiology reports), etc. The training data may be pre-processed, for example, to ensure that it is in a suitable format for the training. The pre-processing may, for example, include resizing the images, tokenizing the text, creating pairs of image-text inputs, etc. The pre-processing may also include augmenting the training data (e.g., by varying the textual descriptions to increase the diversity of the training dataset) to improve the robustness and accuracy of the vision-language model 300.

The vision-language model 300 may include a vision encoding portion (e.g., implemented via a vision encoder 306a) and a text encoding portion (e.g., implemented via a text encoder 306b). In examples, the vision encoder 306a may utilize a vision transformer architecture designed to extract image features 308a from input images 302, while the text encoder 306b may be implemented using a regular transformer architecture designed to extract text features 308b from textual descriptions 304. The image features 308a and text features 308 may then be aligned (e.g., mapped to each other) in a joint embedding space 310 (e.g., through concatenation or some other suitable fusion techniques) to capture the relationships between the visual and textual information. In examples, the vision encoder 306a and the text encoder 306b may be trained first (e.g., separately) on a large number of images and textual descriptions, respectively, and then fine-tuned using an application specific dataset (e.g., a certain type of medical scan images) and/or based on a specific downstream task (e.g., medical image classification).

In examples, a contrastive learning technique may be employed to force the vision-language model 300 to bring similar image-text pairs closer in the joint embedding space 310, while pushing dissimilar image-text pairs further apart. Various contrastive loss functions may be used for this purpose including, for example, those based on normalized temperature-scaled cross-entropy (NT-Xent) or information noise-contrastive estimation (InfoNCE).

The training may help the vision-language model 300 acquire an understanding of the relationships between certain visual and textual embeddings or features such that, when given an image or graph (e.g., the image 106 and/or visual decision indicator 118 of FIG. 1) as input, vision-language model 300 may extract visual features from the input and generate a coherent and informative explanation of the meaning of the visual information contained in the input by relating the extracted visual features to corresponding textual features (e.g., textual descriptions) in the learned joint embedding space 310. For example, given the visual concepts and/or visual decision indicator shown in FIG. 1, vision-language model 300 may generate a description with the following texts: "Engine grille 1 shown in the front of the image and side mirror 2 shown in the top right corner of the image contributed most to the prediction of the ML model, followed by red headlight 3 on the top of the image and wheel 4 in the bottom right corner of the image."

The machine-learning model interpretation techniques described herein may be used for a variety of purposes. For example, the techniques may be used in a computer assisted medical diagnosis system to provide reasoning or evidence for improving the accuracy of diagnostic predictions. As another example, the techniques may be used in a quality control system to provide quality assessment of an ML model (e.g., by identifying which part of the ML model failed a test). The techniques described herein may be also used to identify faulty logic applied by an ML model and to provide information regarding the faulty logic back to the ML model for improving the performance of the ML model.

Figure 4:
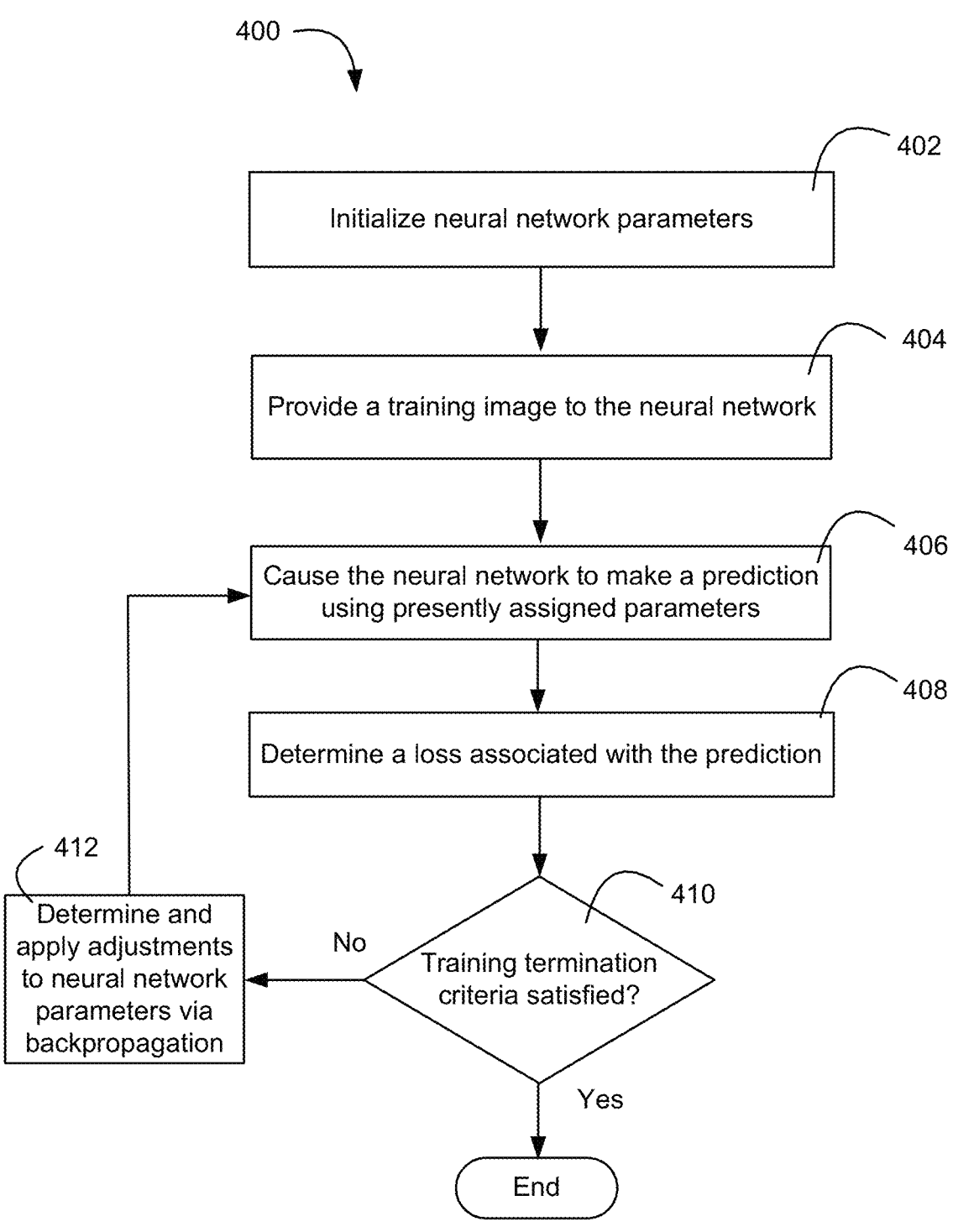
FIG. 4 is a flow diagram illustrating example operations associated with training an artificial neural network to perform one or more of the tasks described in embodiments of the present disclosure.

FIG. 4 illustrates example operations 400 that may be associated with training an artificial neural network (e.g., which may be configured to implement one or more of the ML models described herein) to perform one or more of the tasks described herein. As shown in FIG. 4, training operations 400 may include initializing the operating parameters of the neural network (e.g., weights associated with various layers of the neural network) at 402, for example, by sampling from a probability distribution or by copying the parameters of another neural network having a similar structure. The training operations may further include providing one or more first inputs (e.g., an image to be classified) to the neural network at 404 and causing the neural network to make a prediction (e.g., about a classification label, a visual concept, etc.) using presently assigned network parameters at 406. At 408, the training operations may include determining a loss associated with the prediction, for example, based on a difference between the prediction and corresponding ground truth. At 410, the training operations may further include determining whether one or more training termination criteria have been satisfied. For example, the training termination criteria may be determined to have been satisfied if the difference between the prediction and the ground truth falls below a predetermined threshold value. If the determination at 410 is that the training termination criteria are satisfied, the training may end. Otherwise, the presently assigned network parameters may be adjusted at 412, for example, by backpropagating a gradient descent of the loss through the network, before the training returns to 406.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 5:
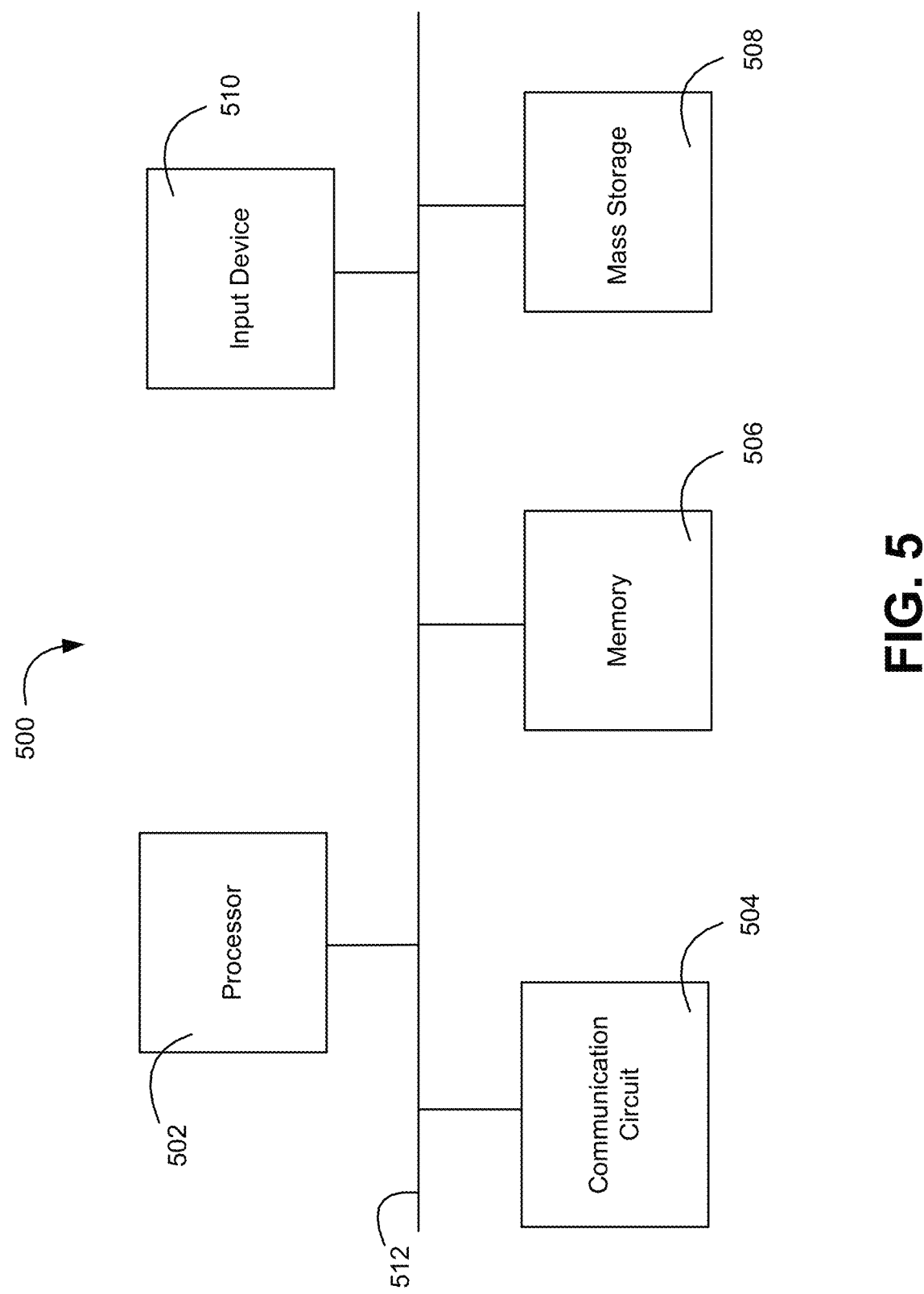
FIG. 5 is a simplified block diagram illustrating an example apparatus that may be configured to perform one or more of the tasks described in embodiments of the present disclosure.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 506 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 5, a skilled person in the art will understand that apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The term "computer-readable storage medium" used herein may include any tangible medium that is capable of storing or encoding a set of instructions for execution by a computer that cause the computer to perform any one or more of the methods described herein. The term "computer-readable storage medium" used herein may include, but not be limited to, solid-state memories, optical media, and magnetic media.

The invention claimed is:

1. An apparatus, comprising:
   one or more processors configured to:
   obtain a prediction about an image, wherein the prediction is made based on a first machine learning (ML) model;
   determine visual concepts associated with the image that are used by the first ML model to make the prediction;
   determine respective contributions of the visual concepts to the prediction made by the first ML model; and
   generate, based on a second ML model, a textual description that explains the respective contributions of the visual concepts to the prediction made by the first ML model;
   wherein the second ML model includes a graph reasoning neural network pre-trained to generate a graph representation that indicates a reasoning process of the first ML model when making the prediction about the image, the graph representation comprising nodes and edges, each node representing a respective one of the visual concepts, each edge connecting two nodes and representing a dependency of the respective visual concepts represented by the two nodes during the reasoning process of the first ML model, and wherein the second ML model further includes a vision-language model pre-trained to determine respective image features associated with the visual concepts, map the determined image features to corresponding text features, and generate the textual description based at least on the text features.

2. The apparatus of claim 1, wherein the vision-language model is trained using a plurality of image-text pairs from which the vision-language model learns a mapping between the image features associated with the visual concepts and the text features used to generate the textual description.

3. The apparatus of claim 2, wherein the vision-language model learns, from the plurality of image-text pairs, a joint embedding space in which the image features-associated with the visual concepts are mapped to the text features used to generate the textual description.

4. The apparatus of claim 1, wherein each of the visual concepts corresponds to one or more patches of the image.

5. The apparatus of claim 1, wherein the vision-language model is implemented using at least an encoder and a decoder, wherein the encoder is configured to determine the respective image features associated with the visual concepts, and wherein the decoder is configured to generate the textual description that explains the respective contributions of the visual concepts to the prediction made by the first ML model.

6. The apparatus of claim 1, wherein the graph reasoning neural network is trained using a knowledge distillation technique via which the graph reasoning neural network learns the reasoning process of the first ML model.

7. The apparatus of claim 6, wherein, during the training of the graph reasoning neural network, parameters of the graph reasoning neural network are optimized by forcing the graph reasoning neural network to make a same prediction about an image as the first ML model when the graph reasoning neural network is given a training graph representation comprising nodes representing visual concepts extracted from the image and edges representing dependencies of the visual concepts.

8. The apparatus of claim 1, wherein the one or more processors being configured to determine the respective contributions of the visual concepts to the prediction made by the first ML model comprises the one or more processors being configured to:
   determine, based on the graph representation generated by the graph reasoning neural network, respective contribution scores of the visual concepts to the prediction; and
   add an indication of the contribution scores to the graph representation.

9. The apparatus of claim 1, wherein the vision-language model is configured to generate the textual description that explains the respective contributions of the visual concepts to the prediction made by the first ML model further based on the graph representation generated by the graph reasoning neural network.

10. The apparatus of claim 1, wherein the prediction about the image is a classification of the image.

11. A method for explaining a decision process of a machine learning (ML) model, the method comprising:
   obtaining a prediction about an image, wherein the prediction is made based on a first ML model;
   determining visual concepts associated with the image that are used by the first ML model to make the prediction;

determining respective contributions of the visual concepts to the prediction made by the first ML model; and generating, based on a second ML model, a textual description that explains the respective contributions of the visual concepts to the prediction made by the first ML model;

wherein the second ML model includes a graph reasoning neural network pre-trained to generate a graph representation that indicates a reasoning process of the first ML model when making the prediction about the image, the graph representation comprising nodes and edges, each node representing a respective one of the visual concepts, each edge connecting two nodes and representing a dependency of the respective visual concepts represented by the two nodes during the reasoning process of the first ML model, and wherein the second ML model further includes a vision-language model pre-trained to determine respective image features associated with the visual concepts, map the determined image features to corresponding text features, and generate the textual description based at least on the text features.

12. The method of claim 11, wherein the vision-language model is trained using a plurality of image-text pairs from which the vision-language model learns a mapping between the image features associated with the visual concepts and the text features used to generate the textual description.

13. The method of claim 12, wherein the vision-language model learns, from the plurality of image-text pairs, a joint embedding space in which the image features associated with the visual concepts are mapped to the text features used to generate the textual description.

14. The method of claim 11, wherein each of the visual concepts corresponds to one or more patches of the image.

15. The method of claim 11, wherein the vision-language model is implemented using at least an encoder and a decoder, wherein the encoder is configured to determine the respective image features associated with the visual concepts, and wherein the decoder is configured to generate the textual description that explains the respective contributions of the visual concepts to the prediction made by the first ML model.

16. The method of claim 11, wherein the graph reasoning neural network is trained using a knowledge distillation technique via which the graph reasoning neural network learns the reasoning process of the first ML model.

17. The method of claim 16, wherein, during the training of the graph reasoning neural network, parameters of the graph reasoning neural network are optimized by forcing the graph reasoning neural network to make a same prediction about an image as the first ML model when the graph reasoning neural network is given a training graph representation comprising nodes representing visual concepts extracted from the image and edges representing dependencies of the visual concepts.

18. The method of claim 11, wherein determining the respective contributions of the visual concepts to the prediction made by the first ML model comprises:

determining, based on the graph representation generated by the graph reasoning neural network, respective contribution scores of the visual concepts to the prediction; and adding an indication of the contribution scores to the graph representation.

19. The method of claim 11, wherein the vision-language model is configured to generate the textual description that explains the respective contributions of the visual concepts to the prediction made by the first ML model further based on the graph representation generated by the graph reasoning neural network.

20. A non-transitory computer-readable medium comprising instructions that, when executed by a processor included in a computing device, cause the processor to implement the method of claim 11.

* * * * *